V. E. KANTER.
RESILIENT TIRE FOR VEHICLE WHEELS.
APPLICATION FILED OCT. 1, 1918.
1,372,232.
Patented Mar. 22, 1921.
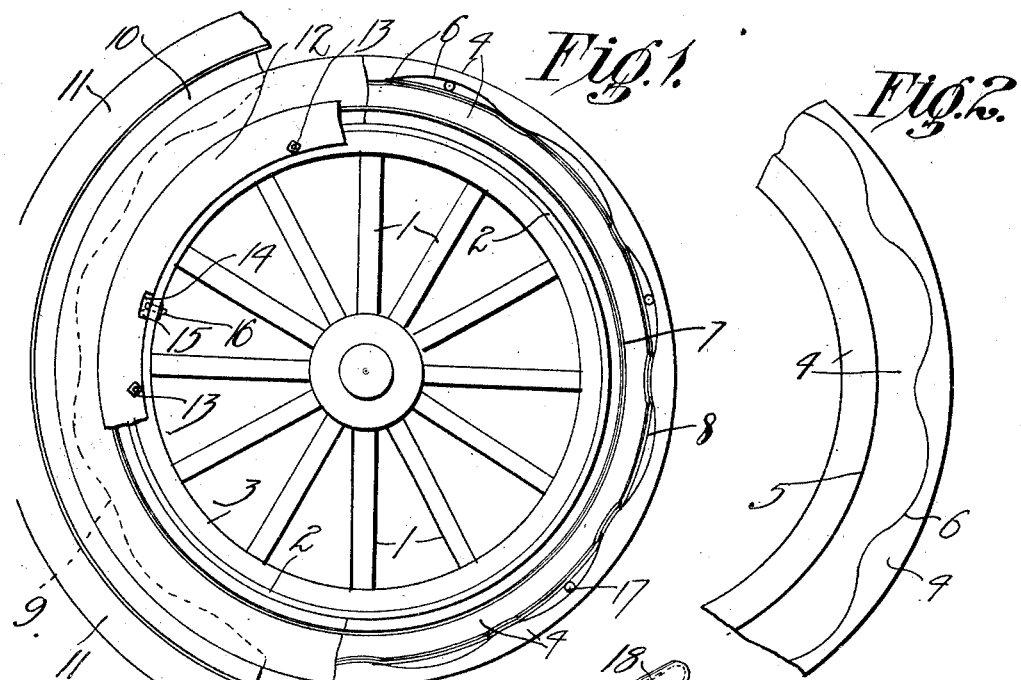
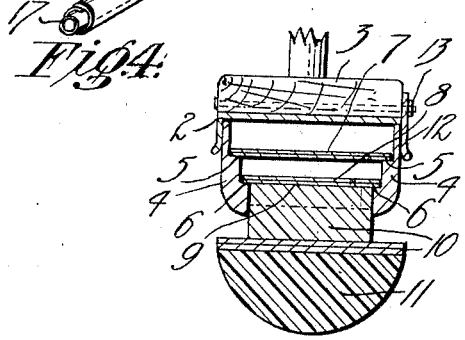
Inventor
Victor Emil Kanter
by Laurence Langner
Atty.

UNITED STATES PATENT OFFICE.

VICTOR EMIL KANTER, OF EAST MELBOURNE, VICTORIA, AUSTRALIA.

RESILIENT TIRE FOR VEHICLE-WHEELS.

1,372,232.                  Specification of Letters Patent.     Patented Mar. 22, 1921.

Application filed October 1, 1918. Serial No. 256,370.

*To all whom it may concern:*

Be it known that I, VICTOR EMIL KANTER, a subject of the King of Great Britain, and resident of 97 Simpson street, East Melbourne, in the State of Victoria and Commonwealth of Australia, have invented a certain new and useful Resilient Tire for Vehicle-Wheels, of which the following is a specification.

This invention relates to improvements in or relating to spring wheels for vehicles.

The spring wheel constructed according to the present invention is an improvement on that type of wheel in which an outer tread of resilient material is carried upon and pressed outward by a floating spring band contained in a hollow ring constructed of annular metal sides or flanges attached to the felly of the wheel, said sides being each provided with an inwardly extending flange for the purpose of limiting the outward pressure of the spring band.

Various means have also been hitherto proposed for preventing creeping of the parts with respect to each other or to the wheel, such for example as serrations or corrugations on the inwardly extending flanges referred to in the preceding paragraph, which enter into locking engagement with similar and permanent serrations or corrugations formed in the floating spring ring or the overhanging edges thereof.

In the present invention, I employ a floating spring band which is normally cylindrical, or in other words is formed without any permanent serrations or corrugations; and in order to facilitate its operation, the circumferential inner edges (or band retaining edges) of the inwardly extending flange or the inner surface of the tread ring, or both, may be provided with serrations or alternately concave and convex curved segmental portions. Where both the retaining edges and the inner surface of the tread ring are provided with such serrations or concave and convex segmental portions, the parts are so arranged that the innermost points of the serrations on the tread ring correspond with the innermost points of the serrations on the retaining edges. This allows of a simultaneous outward expansion of the spring band into the depressions of the serrations at the same time that it is compressed inwardly at other points by the summits of the corrugations on the inside of the tread ring, and this arrangement is of especial importance in the case of a rigid tread ring. This construction, further, will prevent creeping of the tread with regard to the wheel without further special provision as will be hereinafter explained. The invention embraces however special means for more positively preventing creeping in the construction just described, and it also embraces certain general improvements in construction including ring plates, additional to the metal sides or flanges of the felly, suitably spaced apart, and held in position by the sides or flanges of the felly and provided with recessed parts forming retaining edges for limiting the movement of the spring band or bands in the direction away from the center of the wheel. These ring plates will be hereinafter referred to as the side plates.

An essential characteristic of the invention consists in forming serrations or alternately concave and convex curved portions on the plates or rings supported by the flanges of the wheel rim in line with correspondingly shaped curved portions of the inner surface of the tread ring and mounting a resilient band between and across said curved portions so allowing resiliency to be imparted around the wheel and at the same time when any pressure is imparted the band enters the recesses of the curved portions at or near the point of pressure contact while an effective drive is imparted by the grip of the spring band on the curved portions owing to the spring band being slightly larger in circumference than the circumference taken on the line of the protruding edges of the curved portions of the ledges on the ring plates and the inner surface of the tread ring.

The present improvements are illustrated in the accompanying drawings, in which:—

Figure 1 is a sectional side elevation of a wheel embodying the present improvements.

Fig. 2 is a view in elevation of a fragment of a side plate provided with ledges upon which resilient bands or rings exert pressure.

Fig. 3 is a view in cross section of the tire illustrated in Fig. 1.

Fig. 4 is a view in perspective of a detail.

Fig. 5 shows in cross section a modified form.

Referring now to Figs. 1–3 inclusive, the wheel 1 is fitted with a rim 2 provided with annular flanges arranged around the felly 3 in any suitable way. Bearing against the flanges of the rim and the outer cylindrical surface thereof are side plates 4 spaced from each other and bearing against the inside surface of said flanges of the rim 2. In the construction illustrated in Figs. 1, 2, and 3 the side plates 4 are each formed with two circumferential steps or ledges 5, 6 forming limiting ledges for the cylindrical resilient bands hereinafter referred to. The inner ledges 5 are circular and concentric with the wheel 1, while the outer ledges 6 are serrated or undulating, being formed with alternately concave and convex segmental surfaces in the manner illustrated more particularly in Figs. 1 and 2.

Against these ledges 5 and 6 normally cylindrical resilient bands or rings 7, 8 are adapted to bear with an outward pressure, the outer surface of the outer band 8 being in contact with the convex points or summits of the undulations in the ledges 6. The inner surface 9 of the tread ring 10, which latter is formed with any suitable tread surface 11 is also engaged by the outer band 8 as will be presently described. The resilient band may be conveniently sprung into position in assembling in which case it will take up a slightly undulated form as is indicated in Fig. 1.

The inner surface 9 of the tread ring 10 is serrated or curved in a corresponding manner to the ledges 6 above described and is engaged by the undulating bands 8 whereby the tread ring is spaced from and supported upon the wheel. The side plates 4 are held in position by a side ring 12 bolted through the felly of the wheel as at 13, and forming one of the flanges of the wheel rim.

In order to retain the side plates 4 in a rigid position in relation to the wheel center, the rim 2 is provided with spaced cross pieces 14 which engage within notches or slots 15 on the inner edges of the side rings 4 and if these cross pieces are formed separately from the rim they are held by the bolts 16 as illustrated in Fig. 1.

As has been stated, the construction described is of great importance and advantage in the case of a rigid tread ring, for as such a tread ring is displaced without distortion by a shock, the spring band 8 can expand outwardly into the depressions of the ledges 6 and the corresponding depressions of the tread ring 9, simultaneously with the pressing inward of the spring band at other points by the summits of the undulations on the inner surface of the tread ring. Thus there is accommodation for the entire length of the circumference of the spring band 8.

This construction, further, will prevent creeping of the tread ring with regard to the wheel rim without further special provision, for it will be observed that there is a locking effect in the unloaded wheel when the band is sprung into the slightly undulating form, and under running conditions there will be always parts of the spring band expanded into the depressions in the ledges and the tread ring, thus locking the two together and preventing any creeping.

One form of auxiliary means for preventing any creep of the tread ring 10 relatively to the limiting edges is illustrated in Fig. 4 and consists of a roller 17 which is adapted to be arranged between the spring ring 8 and the inner surface 9 of the tread ring 10 and the limiting edges (see Fig. 1) of side plates 4, the rollers being surrounded by a split spring tube 18 adapted to collapse against the rollers 17 under pressure of the spring band 8. Thus they are retained in position as indicated in Fig. 1 without unduly preventing the expansion of the spring band into the depressions.

The inner spring band 7 bounded by the ledge 5 is preferably provided as an auxiliary means of absorbing any excessive shocks. Fig. 5 shows in cross section a modified form in which this additional means is dispensed with.

The spring band 8 may be connected to the tread ring or not, as may be desired. Thus in the case of a flexible tread ring it may in general be connected whereas in the case of a rigid ring it is usually preferable that the tread ring and the spring band are left free of any positive connection.

I claim as my invention:

1. A resilient wheel for vehicles comprising a wheel rim; means secured to the wheel rim having circumferential ledges; a normally cylindrical spring band engaging and limited in movement by said ledges; and a tread ring having an undulating surface in engagement with said band and whereby said tread is supported on the wheel.

2. In a resilient wheel, the combination of a wheel rim; side flanges secured to the rim; side plates, secured to the wheel rim by said side flanges; a tread ring held against transverse displacement by said side plates and having an undulating inner surface constituted by a succession of convex and concave portions; and a normally cylindrical spring ring sprung in a slightly undulating form into engagement with portions of the undulating surface of the tread ring.

3. In a resilient wheel, the combination of a wheel rim; side flanges secured to the rim; side plates, one secured to each rim flange whereby said side plates are securely mounted in spaced relation on the wheel rim, said side plates having on their inner faces undulating circumferential ledges, constituted by a succession of convex and concave portions; a normally cylindrical spring band sprung in a slightly undulating form into engagement with portions of said undulating ledges; and a tread ring having an undulating inner surface engaging the band and corresponding to the undulations of the ledge, said tread ring being supported by said spring band so that a shock is transmitted around the periphery of the wheel.

VICTOR EMIL KANTER.

Witnesses:
 A. EDWARDS,
 J. BONSTIERE.